Figure 1:
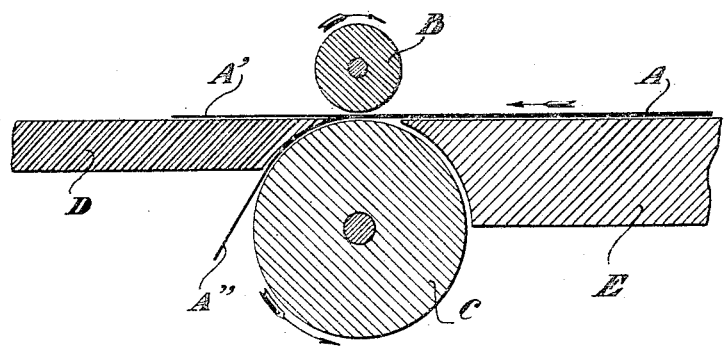

J. RUPKE.
TIP OR MOUTHPIECE FOR CIGARETTES, CIGARS, OR THE LIKE.
APPLICATION FILED JUNE 18, 1918.

1,288,208. Patented Dec. 17, 1918.

INVENTOR
Jan Rupke
BY
ATTORNEYS

UNITED STATES PATENT OFFICE.

JAN RUPKE, OF WADDINXVEEN, NETHERLANDS, ASSIGNOR TO NAAMLOOZE VENNOOT-SCHAP WADDINXVEENSCHE KURKWARENFABRICK VOORHEEN L. VERMEULEN & CO., OF WADDINXVEEN, NETHERLANDS, A COMPANY OF THE NETHERLANDS.

TIP OR MOUTHPIECE FOR CIGARETTES, CIGARS, OR THE LIKE.

1,288,208.  Specification of Letters Patent.  Patented Dec. 17, 1918.

Application filed June 18, 1918. Serial No. 240,701.

*To all whom it may concern:*

Be it known that I, JAN RUPKE, a subject of the Queen of the Netherlands, residing at Waddinxveen, the Netherlands, have invented certain new and useful Improvements in Tips or Mouthpieces for Cigarettes, Cigars, or the like, of which the following is a specification.

Tips or mouth-pieces for cigarettes, cigars, etc., must in the very first place be absolutely harmless to the smoker. So-called "gold-tips" do not answer this requirement as the material used in the manufacture of same is composed almost exclusively of copper and may therefore cause poisoning symptoms; if such tips were made of pure gold they would, as a matter of course, be too expensive.

It has already been proposed to make such tips or mouth-pieces of straw. Besides being very cheap, this material is absolutely harmless from a hygienic point of view. The manufacture of tips of this material, however causes considerable trouble, as the hard exterior layer of tissue renders the material very brittle so that unless it be treated with the utmost care it easily cracks.

As a substitute for straw for the said purpose cork is extensively used. From a hygienic point of view this material is as good as straw; moreover, it can easily be cut into thin bands of the required width, from which tips or mouth-pieces can be made in a manner well-known in the art. Cork, however, is a rather expensive material so that it cannot be economically used for inferior qualities of cigarettes.

Now, according to the present invention, straws or other vegetable stalks are split in such a manner that the exterior hard layer of tissue is severed from the very flexible interior layer, after which the latter is used for the manufacture of tips or mouth-pieces for cigarettes or cigars in some known manner. If required the said flexible inner layer may be split again into two layers in case of its thickness allowing of such operation.

In carrying the new method into practice the stalks, after being slit lengthwise and spread out, are passed between cylinders and fed by the latter against a knife for effecting the necessary splitting operation.

Owing to its flexibility the new material may be used for the manufacture of tips or mouth-pieces without causing any appreciable trouble, so that the manufacture of such tips or mouth-pieces does not after all entail more cost than that of ordinary straw tips, especially not as the exterior hard layer of tissue constitutes a valuable by-product.

Figure 2:
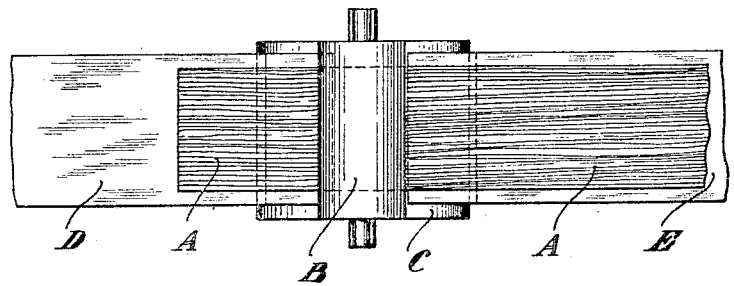

Figure 1 of the annexed drawing shows somewhat diagrammatically a sectional elevation, and Fig. 2 a plan view of an apparatus for carrying the improved process into practice.

In this drawing, E is a table for supporting the straws A or the like, which are previously split lengthwise and spread out. The split stalks are caused to travel between two rotatable cylinders B, C, by which they are gripped and fed against a knife D, whose cutting edge is somewhat longer than the width of the material to be treated, and which is located in the immediate proximity of the plane passing through the axes of the cylinders. In this operation the exterior hard layer A′ is through the full width of the material severed from the flexible interior layer A″, after which the latter may be employed for the manufacture of tips or mouth-pieces in some manner well-known in the art. To this end the material may previously be passed between pressing rollers and impregnated with suitable coloring matter. If the interior flexible layer of tissue has a sufficient thickness it may conveniently be split again, and in this case it is caused to again travel between the cylinders B, C.

The described apparatus may be modified in accordance with the special properties of the material to be treated. For instance, it may be desirable for the top face of the supporting table E to be somewhat curved, in which case the rollers B, C, and the knife D should have a corresponding cross-sectional shape. If a flat supporting table E is used, a circular knife may be employed, to which rotary movement is imparted in a plane which is parallel with the top face of said table.

The ratio between the rotary speeds and between the diameters of the rollers B and C evidently depends upon the nature of the material to be treated.

What I claim as my invention is:

A tip for cigarettes, cigars, or the like formed of straw, the outer hard layer of which has been removed.

In testimony whereof I affix my signature.

JAN RUPKE.

Copies of this patent may be obtained for five cents each, by addressing the "Commissioner of Patents, Washington, D. C."